United States Patent
Wang (10) Patent No.: US 9,495,608 B2
(45) Date of Patent: Nov. 15, 2016

(54) SMART FEELING SENSING TAG FOR PICTURES

(71) Applicant: Sony Corporation, Tokyo (JP)

(72) Inventor: Jing Wang, Lund (SE)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 0 days.

(21) Appl. No.: 14/354,956

(22) PCT Filed: Jul. 2, 2013

(86) PCT No.: PCT/IB2013/055424
§ 371 (c)(1),
(2) Date: Apr. 29, 2014

(87) PCT Pub. No.: WO2015/001384
PCT Pub. Date: Jan. 8, 2015

(65) Prior Publication Data
US 2016/0125259 A1    May 5, 2016

(51) Int. Cl.
| | | |
|---|---|---|
| G06K 9/00 | (2006.01) | |
| G06K 9/46 | (2006.01) | |
| H04N 1/32 | (2006.01) | |
| H04N 1/60 | (2006.01) | |
| G06T 7/00 | (2006.01) | |
| G06T 7/40 | (2006.01) | |
| H04N 1/56 | (2006.01) | |

(52) U.S. Cl.
CPC ........... *G06K 9/4652* (2013.01); *G06T 7/0081* (2013.01); *G06T 7/408* (2013.01); *H04N 1/32101* (2013.01); *H04N 1/56* (2013.01); *H04N 1/60* (2013.01); *G06T 2207/10004* (2013.01); *G06T 2207/10024* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,972,305 A * | 11/1990 | Blackburn | .............. | G09F 19/18 362/234 |
| 5,262,765 A * | 11/1993 | Tsumura | ............... | G06T 13/205 345/473 |
| 7,127,120 B2 * | 10/2006 | Hua | ....................... | G11B 27/28 348/616 |
| 7,500,176 B2 * | 3/2009 | Thomson | ............... | G10H 1/368 715/202 |
| 7,716,572 B2 * | 5/2010 | Beauregard | .......... | G11B 27/005 386/281 |

(Continued)

FOREIGN PATENT DOCUMENTS

KR    20110121830 A    11/2011

OTHER PUBLICATIONS

International Search Report and Written Opinion; Apr. 2, 2014; issued in International Patent Application No. PCT/IB2013/055424.

(Continued)

*Primary Examiner* — Anand Bhatnagar
(74) *Attorney, Agent, or Firm* — James C. Edwards; Moore & Van Allen PLLC (57) ABSTRACT

The invention is directed to systems, methods and computer program products for determining a mood and a strength of an image. An exemplary method comprises: determining a mood of an image based on a color tone and a color saturation of the image; determining a strength of an image based on a brightness of the image; determining a mood-strength distribution of the image based on the mood of the image and the strength of the image; and selecting a music piece based on the mood-strength distribution of the image.

17 Claims, 8 Drawing Sheets

(56) References Cited

U.S. PATENT DOCUMENTS

| | | | | |
|---|---|---|---|---|
| 7,754,959 B2* | 7/2010 | Herberger | ............... | G10H 1/368 84/601 |
| 8,006,186 B2* | 8/2011 | Kellock | ................ | G11B 27/034 715/721 |
| 8,020,914 B2* | 9/2011 | Burns | ..................... | B60J 3/0217 296/97.13 |
| 8,259,192 B2* | 9/2012 | Nair | ...................... | G11B 27/034 348/231.4 |
| 8,666,156 B2* | 3/2014 | Schadt | .................. | G06K 9/4652 382/162 |
| 8,891,909 B2* | 11/2014 | Mochizuki | ................ | G06T 5/00 382/305 |
| 9,213,747 B2* | 12/2015 | Cremer | ............. | G06F 17/30864 |
| 2005/0158037 A1* | 7/2005 | Okabayashi | ........... | G10H 1/368 386/248 |
| 2008/0016114 A1* | 1/2008 | Beauregard | ........... | G11B 27/005 |
| 2009/0217167 A1 | 8/2009 | Sugama et al. | | |
| 2010/0091138 A1* | 4/2010 | Nair | ...................... | G11B 27/034 348/231.4 |
| 2011/0305395 A1 | 12/2011 | Takayama et al. | | |
| 2014/0330848 A1* | 11/2014 | Chen | .................. | G06F 17/30053 707/749 |
| 2014/0376888 A1* | 12/2014 | Mochizuki | ................ | G06T 5/00 386/285 |
| 2015/0155008 A1* | 6/2015 | Herberger | ............ | G11B 27/034 386/224 |
| 2015/0220633 A1* | 8/2015 | Fuzell-Casey | ......... | G06Q 10/00 707/748 |

OTHER PUBLICATIONS

International Preliminary Report on Patentability; Jan. 14, 2016; issued in International Patent Application No. PCT/IB2013/0555424.

\* cited by examiner

SMART FEELING SENSING TAG FOR PICTURES

BACKGROUND

A user may select a set of pictures to view as a slideshow on a computing device. Additionally, the user may select music to be played as background music during the progression of the slideshow. However, there may be a mismatch between the mood of the background music and the mood of the pictures. For example, the pictures may be those taken on a rainy day, and the music may include a "happy" rhythm or strong drumbeats. Consequently, the user may encounter an unpleasant experience when viewing the slideshow. Therefore, there is a need for a computing device or application that can select music which matches the mood of the pictures in the slideshow.

BRIEF SUMMARY

Embodiments of the invention are directed to systems, methods and computer program products for determining a mood and a strength of an image. An exemplary method comprises determining a mood of an image based on a color tone and a color saturation of the image; determining a strength of an image based on a brightness of the image; determining a mood-strength distribution of the image based on the mood of the image and the strength of the image; and selecting a music piece based on the mood-strength distribution of the image.

In some embodiments, the method further comprises plotting the mood of the image and the strength of the image on a dual-axis chart, wherein the chart comprises a mood axis and a strength axis, wherein the plotted image represents a mood-strength distribution of the image.

In some embodiments, a hue of the image represents the color tone of the image and a chroma of the image represents the color saturation of the image.

In some embodiments, the mood is associated with a happiness scale.

In some embodiments, an image that has a predominantly cyan color tone is placed lower on the happiness scale compared to an image that has a predominantly red color tone.

In some embodiments, an image that has higher color saturation level is placed higher on the happiness scale compared to an image that has a lower color saturation level.

In some embodiments, the method further comprises determining a grid for the image, wherein the grid divides the image into a grid of blocks, and wherein a size of the grid is based on a size of the image.

In some embodiments, the method further comprises determining a color tone and a color saturation for each block in the grid of blocks; and plotting a hue and chroma color space based on the determined color tone and the color saturation for each block in the grid of blocks.

In some embodiments, the method further comprises determining a mood index for each block in the grid of blocks.

In some embodiments, the method further comprises determining whether a face is present in the image; in response to determining a face is present in the image, determining whether an image pattern associated with the face substantially matches an image pattern in a database of image patterns; determining a coefficient associated with the matched image pattern; and using the coefficient in determining the mood index.

In some embodiments, the strength of the image is associated with a strength scale, and wherein an image with a higher brightness level is placed higher on the strength scale compared to an image that a lower brightness level.

In some embodiments, the brightness of the image is determined based on histogram information associated with the image.

In some embodiments, the computing device comprises a portable mobile communication device.

In some embodiments, the method further comprises presenting the image as part of an image slideshow, wherein the slideshow comprises at least two images; and playing the music piece simultaneously with the presentation of the image slideshow.

In some embodiments, an apparatus is provided for determining a mood and a strength of an image. The apparatus comprises a memory; a processor; and a module stored in the memory, executable by the processor, and configured to: determine a mood of an image based on a color tone and a color saturation of the image; determine a strength of an image based on a brightness of the image; determine a mood-strength distribution of the image based on the mood of the image and the strength of the image; and select a music piece based on the mood-strength distribution of the image.

In some embodiments, a computer program product is provided for determining a mood and a strength of an image. The computer program product comprises a non-transitory computer-readable medium comprising a set of codes for causing a computer to: determine a mood of an image based on a color tone and a color saturation of the image; determine a strength of an image based on a brightness of the image; determine a mood-strength distribution of the image based on the mood of the image and the strength of the image; and select a music piece based on the mood-strength distribution of the image.

BRIEF DESCRIPTION OF THE DRAWINGS

Having thus described embodiments of the invention in general terms, reference will now be made to the accompanying drawings, where:

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Embodiments of the invention are directed to systems, methods and computer program products for determining a mood and a strength of an image. An exemplary method comprises determining a mood of an image based on a color tone and a color saturation of the image; determining a strength of an image based on a brightness of the image; determining a mood-strength distribution of the image based on the mood of the image and the strength of the image; and selecting a music piece based on the mood-strength distribution of the image.

Figure 1:
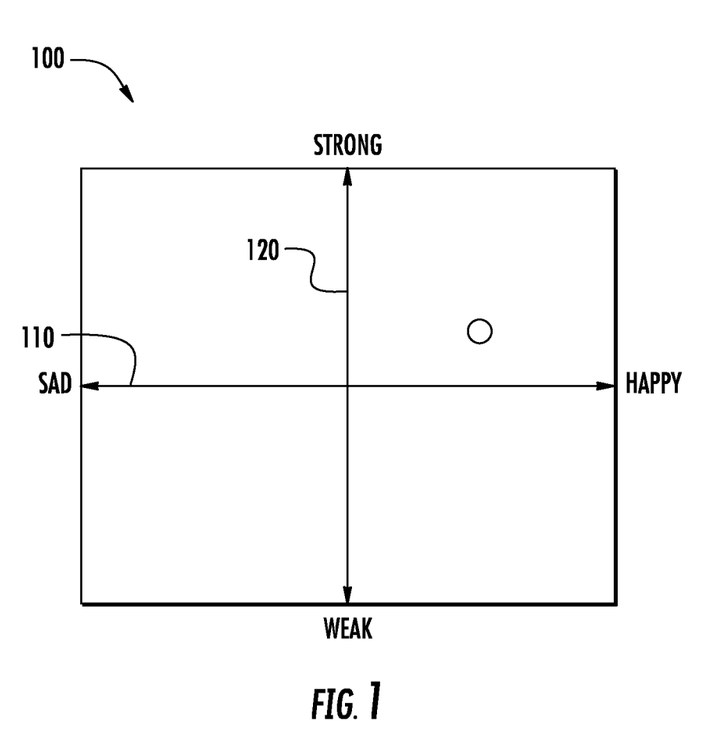
FIG. 1 is an exemplary dual axis map for an image, in accordance with embodiments of the present invention.

The present invention is directed to mapping a picture on a dual axis map based on a mood and strength of the picture. Referring now to FIG. 1, FIG. 1 presents a dual axis map 100. The mood of the picture ranges from "happy" to "sad" along a first axis 110. The strength of the picture ranges from "strong" to "weak" along a second axis 120.

Figure 2:
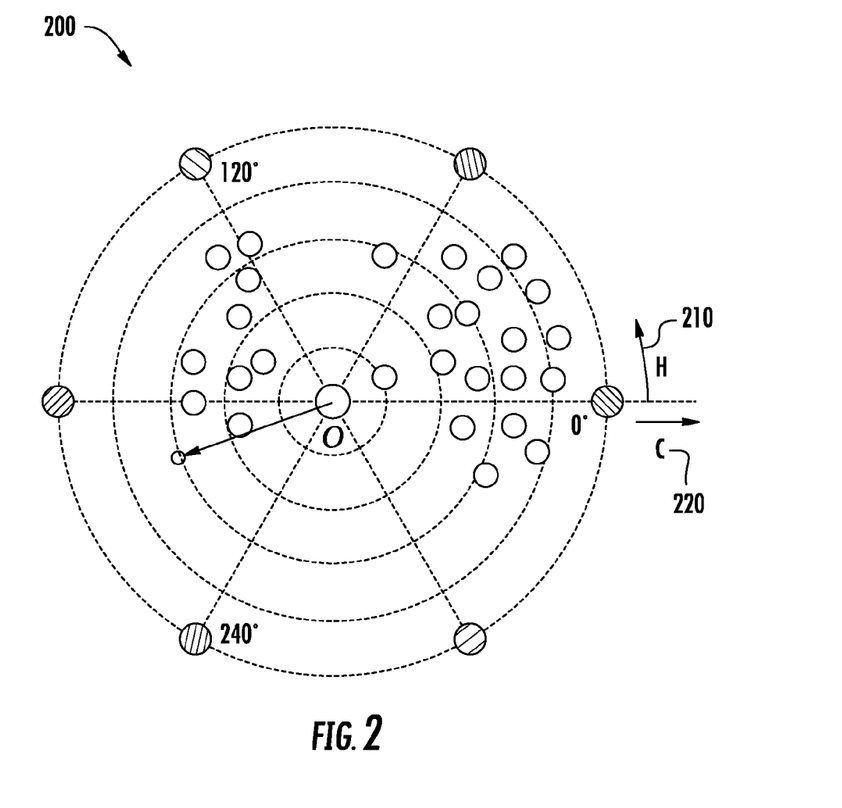
FIG. 2 is an exemplary hue and chroma ("HSV") color space, in accordance with embodiments of the present invention.

Referring now to FIG. 2, FIG. 2 presents a picture map on a hue and chroma ("HSV") color space 200 to determine the mood of an image. Hue 210 represents the color tone and chroma 220 represents the color saturation. The mood of the image is determined based on a color distribution and color saturation of the picture. Generally, an image that has a cyan color and/or a lower saturation indicates a sad mood. An image that has a red color and/or a higher saturation indicates a happy mood.

Initially, a picture is divided into a number of blocks based on a grid (A×B). The size of the grid is based on the size of the image. Subsequently, the average color tone and saturation is calculated for each block. Using the average color tone and saturation information for all blocks in the grid, a HSV color space such as that presented in FIG. 2 can be plotted.

For each block of the image, a mood index $I_{mood}(n)$ for the $n^{th}$ block of the image is calculated using Equation 1. K1 is the coefficient value for hue and chroma as determined by mathematical computation and K2 is the variable adjustment parameter which is used when a special image pattern is detected. The application described herein determines whether a face is present in the image. If a face is present in the image, the application determines whether an image pattern associated with the face substantially matches (to a predetermined threshold of similarity) an image pattern in a database of image patterns. If a matched image pattern is determined, the coefficient associated with that matched image pattern is considered in the computation of Equation 1. If a matched image pattern is not determined, the coefficient may take a null value or alternatively, a coefficient associated with the closest matched image pattern or a general facial coefficient is considered in the computation of Equation 1.

For example, if a smiling face is detected in the image, K2($m$) is added in the computation of Equation 1. In Equation 1, 'm' refers to the $m^{th}$ pattern (e.g., a smiling face pattern) that is obtained from a look-up table. A smiling face pattern may be associated with a coefficient that increases the mood index, and a sad face pattern may be associated with a coefficient that decreases the mood index.

$$Imood(n) = K1 \times abs\ [Hue(n) - 180°] \times \pi \times Chroma\ (n) + K2(m) \quad \text{(Equation 1)}$$

Subsequently, a mood index $I_{mood}$ is calculated for the entire image based on Equation 2. $a_n$ and $b_n$ are coefficients determined by mathematical computation.

$$Imood = \frac{\sum_{n=1}^{A \times B} (a_n Imood(n) + b_n)}{A \times B} \quad \text{(Equation 2)}$$

Figure 3A:
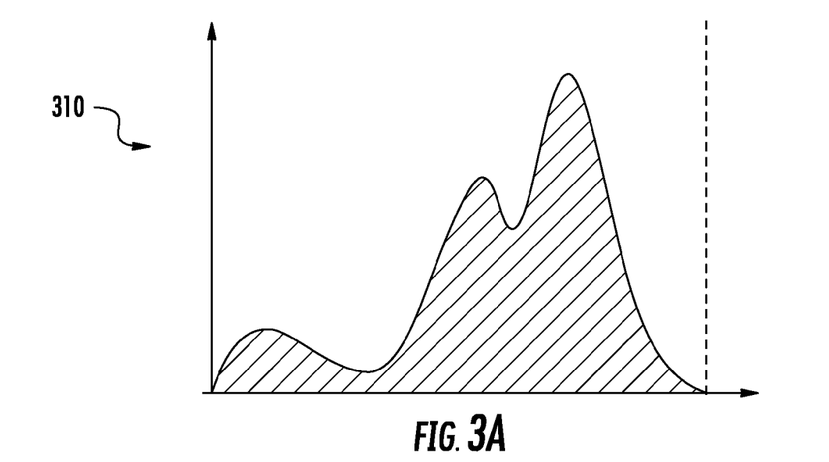
FIG. 3 is an exemplary histogram information graph associated with an image, in accordance with embodiments of the present invention.
Figure 3B:
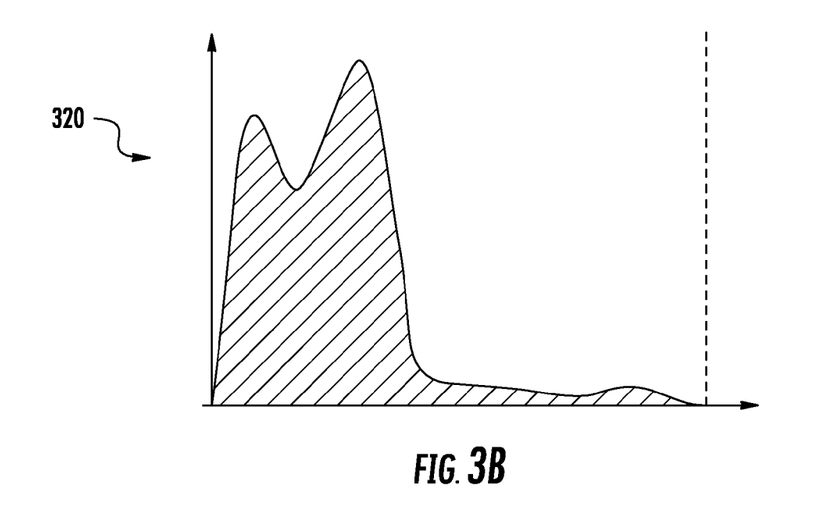

Referring now to FIG. 3, FIG. 3 presents histogram information associated with two images. The histogram information associated with an image is a graphical representation of the energy distribution of the image. As used herein, the energy distribution of the image may also refer to the amount of light associated with various parts of the image. A brighter image represents a stronger image on the appropriate axis of FIG. 1, and a darker image represents a weaker image on the appropriate axis of FIG. 1.

The first image 310 represents histogram information associated with a brighter image. This histogram information represents a "stronger" image on the appropriate axis of FIG. 1. The second image 310 represents histogram information associated with a darker image. This histogram information represents a "weaker" image on the appropriate axis of FIG. 1.

Once the mood and strength of an image is determined, the image can be plotted on the dual axis map of FIG. 1. The mood and strength associated with a set of images (e.g., the set of images to be presented in a slideshow) can be plotted on the dual axis map. Once the mood and strength of the set of images is plotted, an application can determine at least one piece of music (e.g., one or more songs) that can be played as background music when the slideshow is being presented. The determined piece of music has a mood and strength map that is similar (e.g., equal to or greater than a predetermined threshold of similarity) to the mood and strength map of the pictures to be presented in the slideshow. Therefore, the application compares the mood and strength map of the at least one picture to be presented in the slideshow to the mood and strength map of at least one piece of music. Once at least one matching piece of music is determined, the at least one matching piece of music is played as background music while the picture slideshow is presented on a display device. In some embodiments, the user may be given a choice to play the selected piece of music or choose another piece of music. If more than one piece of matching music is determined, the user may be given a choice to choose among the one or more pieces of matching music.

Figure 4:
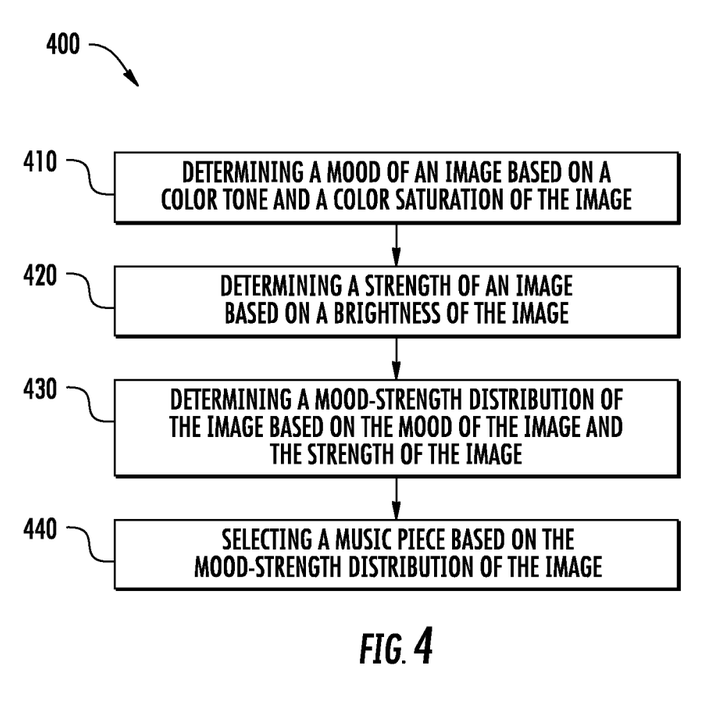
FIG. 4 is an exemplary process flow determining a mood and a strength of an image, in accordance with embodiments of the present invention.

Referring now to FIG. 4, FIG. 4 presents a process flow 400 for determining a mood and a strength of an image. The various process blocks presented in FIG. 4 may be executed in an order that is different from that presented in FIG. 4. At block 410, the process flow comprises determining a mood of an image based on a color tone a color saturation of the image. At block 420, the process flow comprises determining a strength of an image based on a brightness of the image. At block 430, the process flow comprises determining a mood-strength distribution of the image based on the mood of the image and the strength of the image. At block 440, the process flow comprises selecting a music piece based on the mood-strength distribution of the image.

Figure 5:
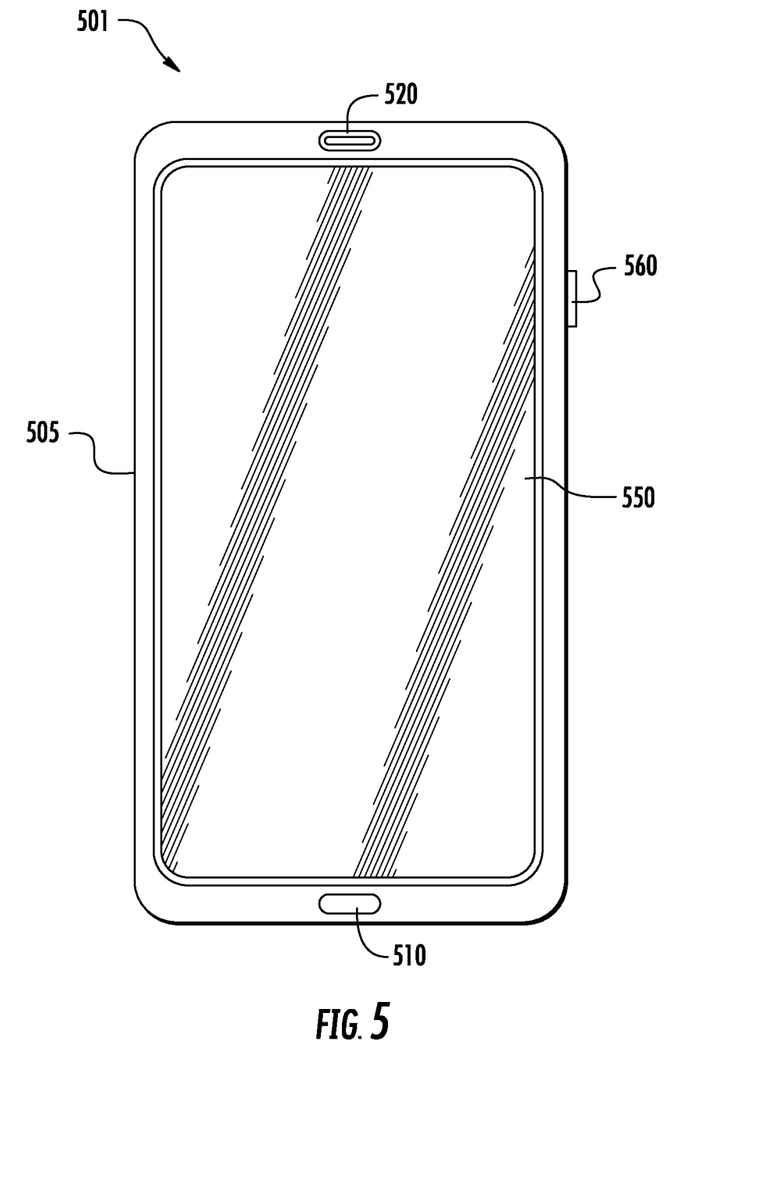
FIG. 5 is an exemplary image-capturing device, in accordance with embodiments of the present invention.

Referring now to FIG. 5, FIG. 5 is a diagram illustrating a front view of external components of an exemplary device (e.g., an image-capturing device). The image-capturing device illustrated in FIG. 5 is a mobile communication device (e.g., a mobile phone). In alternate embodiments, the image-capturing device may be any other computing device described herein. The image-capturing device may be used to capture images described herein. Additionally or alternatively, the image-capturing device may also display images or may be connected (either wireless or wired) to a display device. Additionally or alternatively, the image-capturing device may perform any of the computing functions described herein.

The invention is not limited to any particular types of image-capturing devices. Examples of image-capturing devices include mobile computing devices (e.g., mobile phones), image capturing devices (e.g., cameras), gaming devices, laptop computers, smart screens, tablet computers or tablets, desktop computers, e-readers, scanners, portable media players, televisions, or other portable or non-portable computing or non-computing devices. As illustrated in FIG. 5, image-capturing device 501 may include a housing 505, a microphone 510, a speaker 520, a display 550, and a camera button 560.

Housing 505 may include a structure configured to contain or at least partially contain components of image-capturing device 501. For example, housing 505 may be formed from plastic, metal or other natural or synthetic materials or combination(s) of materials and may be configured to support microphone 510, speaker 520, display 550, and camera button 560.

Microphone 510 may include any component capable of transducing air pressure waves to a corresponding electrical signal. For example, a user may speak into microphone 510 during a telephone call. Speaker 520 may include any component capable of transducing an electrical signal to a corresponding sound wave. For example, a user may listen to music through speaker 520.

The display 550 may function as a touchpad or touchscreen. Touchpad may include any component capable of providing input to device 501. Touchpad may include a standard telephone keypad or a QWERTY keypad. Touchpad may also include one or more special purpose keys. A user may utilize touchpad for entering information, such as text or a phone number, or activating a special function, such as placing a telephone call, playing various media, setting various camera features (e.g., focus, zoom, etc.) or accessing an application.

Display 550 may include any component capable of providing visual information. For example, in one implementation, display 550 may be a liquid crystal display (LCD). In another implementation, display 550 may be any one of other display technologies, such as a plasma display panel (PDP), a field emission display (FED), a thin film transistor (TFT) display, etc. Display 550 may be utilized to display, for example, text, image, and/or video information. Display 550 may also operate as a view finder, as will be described later. Camera button 560 may be a pushbutton that enables a user to take an image.

Since image-capturing device 501 illustrated in FIG. 5 is exemplary in nature, image-capturing device 501 is intended to be broadly interpreted to include any type of electronic device that includes an image-capturing component. For example, image-capturing device 501 may include a mobile phone, a personal digital assistant (PDA), a portable computer, a camera, or a watch. In other instances, image-capturing device 501 may include, for example, security devices or military devices. Accordingly, although FIG. 5 illustrates exemplary external components of image-capturing device 501, in other implementations, image-capturing device 501 may contain fewer, different, or additional external components than the external components depicted in FIG. 5. Additionally, or alternatively, one or more external components of image-capturing device 501 may include the capabilities of one or more other external components of image-capturing device 501. For example, display 550 may be an input component (e.g., a touch screen). The touch screen may function as a keypad or a touchpad. Additionally or alternatively, the external components may be arranged differently than the external components depicted in FIG. 5.

Figure 6:
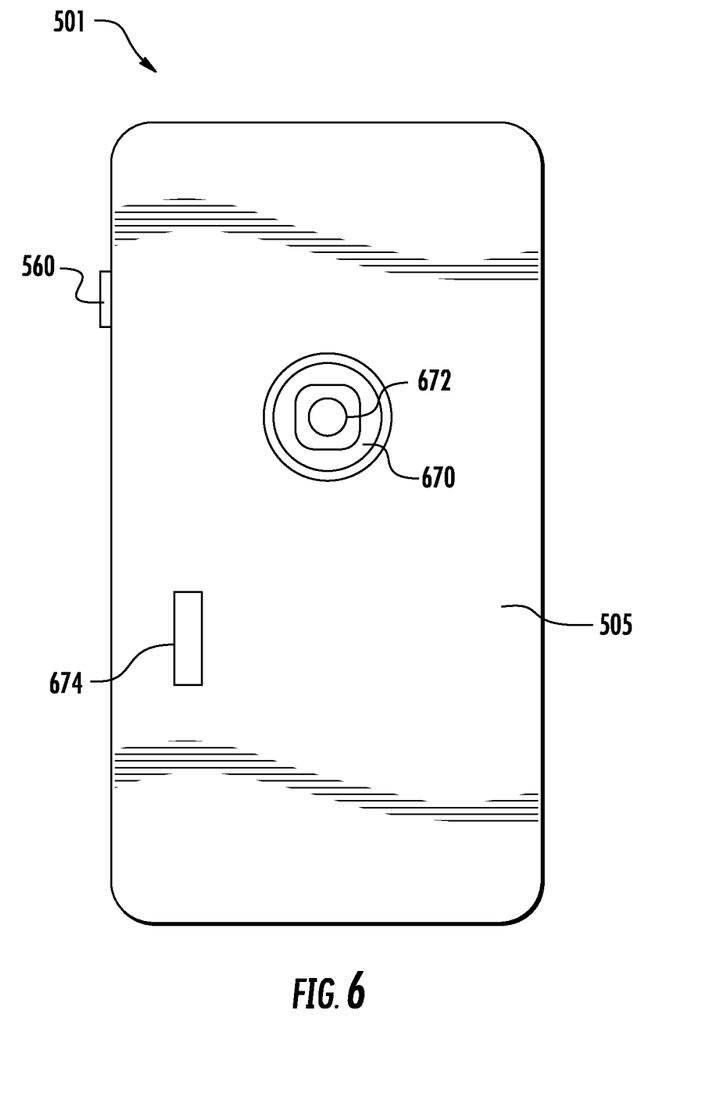
FIG. 6 is a diagram illustrating a rear view of exemplary external components of the image-capturing device depicted in FIG. 5, in accordance with embodiments of the present invention.

Referring now to FIG. 6, FIG. 6 is a diagram illustrating a rear view of external components of the exemplary image-capturing device. As illustrated, in addition to the components previously described, image-capturing device 501 may include a camera 670, a lens assembly 672, a proximity sensor 676, and a flash 674.

Camera 670 may include any component capable of capturing an image. Camera 670 may be a digital camera. Display 550 may operate as a view finder when a user of image-capturing device 501 operates camera 670. Camera 670 may provide for adjustment of a camera setting. In one implementation, image-capturing device 501 may include camera software that is displayable on display 550 to allow a user to adjust a camera setting.

Lens assembly 672 may include any component capable of manipulating light so that an image may be captured. Lens assembly 672 may include a number of optical lens elements. The optical lens elements may be of different shapes (e.g., convex, biconvex, plano-convex, concave, etc.) and different distances of separation. An optical lens element may be made from glass, plastic (e.g., acrylic), or plexiglass. The optical lens may be multicoated (e.g., an antireflection coating or an ultraviolet (UV) coating) to minimize unwanted effects, such as lens flare and inaccurate color. In one implementation, lens assembly 672 may be permanently fixed to camera 670. In other implementations, lens assembly 672 may be interchangeable with other lenses having different optical characteristics. Lens assembly 672 may provide for a variable aperture size (e.g., adjustable f-number).

Proximity sensor 676 (not shown in FIG. 6) may include any component capable of collecting and providing distance information that may be used to enable camera 670 to capture an image properly. For example, proximity sensor 676 may include a proximity sensor that allows camera 670 to compute the distance to an object. In another implementation, proximity sensor 676 may include an acoustic proximity sensor. The acoustic proximity sensor may include a timing circuit to measure echo return of ultrasonic soundwaves. In embodiments that include a proximity sensor 676, the proximity sensor may be used to determine a distance to one or more moving objects, which may or may not be in focus, either prior to, during, or after capturing of an image frame of a scene. In some embodiments, proximity of an object to the image-capturing device may be calculated during a post-processing step (e.g., after capturing the image).

Flash 674 may include any type of light-emitting component to provide illumination when camera 670 captures an image. For example, flash 674 may be a light-emitting diode (LED) flash (e.g., white LED) or a xenon flash. In another implementation, flash 674 may include a flash module.

Although FIG. 6 illustrates exemplary external components, in other implementations, image-capturing device 501 may include fewer, additional, and/or different components than the exemplary external components depicted in FIG. 6. For example, in other implementations, camera 670 may be a film camera. Additionally, or alternatively, depending on image-capturing device 501, flash 674 may be a portable flashgun. Additionally, or alternatively, image-capturing device 501 may be a single-lens reflex camera. In still other implementations, one or more external components of image-capturing device 501 may be arranged differently.

Figure 7:
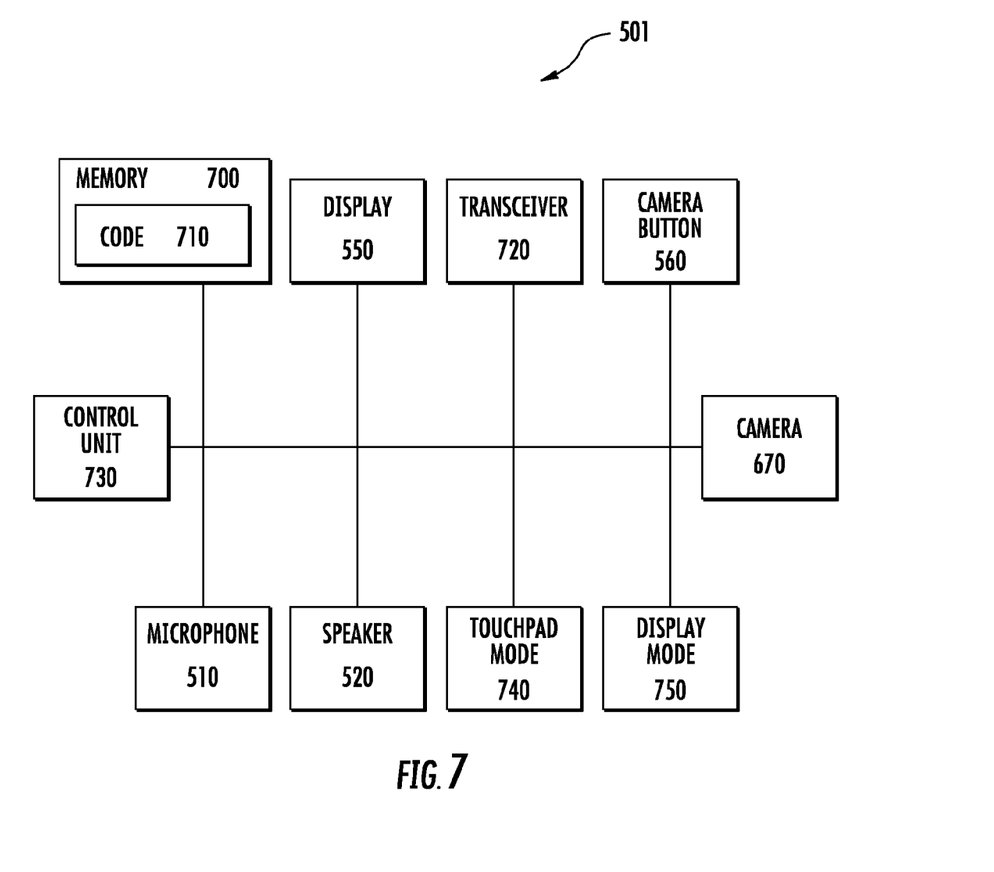
FIG. 7 is a diagram illustrating exemplary internal components of the image-capturing device depicted in FIG. 5, in accordance with embodiments of the present invention.

Referring now to FIG. 7, FIG. 7 is a diagram illustrating internal components of the exemplary image-capturing device. As illustrated, image-capturing device 501 may include microphone 510, speaker 520, display 550, camera button 560, camera 670, a memory 700, a transceiver 720, and a control unit 730. Additionally, the control unit 730 may enable a user to switch between touchpad mode 740 and display mode 750. In touchpad mode 740, the display 550 functions as at least one of an input device (e.g., a numeric keypad or a QWERTY touchpad) or an output device. In display mode 750, the display 550 functions as an output device.

Memory 700 may include any type of storing component to store data and instructions related to the operation and use of image-capturing device 501. For example, memory 700 may include a memory component, such as a random access memory (RAM), a read only memory (ROM), and/or a programmable read only memory (PROM). Additionally, memory 700 may include a storage component, such as a magnetic storage component (e.g., a hard drive) or other type of computer-readable or computer-executable medium. Memory 700 may also include an external storing component, such as a Universal Serial Bus (USB) memory stick, a digital camera memory card, and/or a Subscriber Identity Module (SIM) card.

Memory 700 may include a code component 710 that includes computer-readable or computer-executable instructions to perform one or more functions. These functions include initiating and/or executing the processes described herein. The code component 710 may work in conjunction with one or more other hardware or software components associated with the image-capturing device 501 to initiate and/or execute the processes described herein. Additionally, code component 710 may include computer-readable or computer-executable instructions to provide other functionality other than as described herein.

Transceiver 720 may include any component capable of transmitting and receiving information wirelessly or via a wired connection. For example, transceiver 720 may include a radio circuit that provides wireless communication with a network or another device.

Control unit 730 may include any logic that may interpret and execute instructions, and may control the overall operation of image-capturing device 501. Logic, as used herein, may include hardware, software, and/or a combination of hardware and software. Control unit 730 may include, for example, a general-purpose processor, a microprocessor, a data processor, a co-processor, and/or a network processor. Control unit 730 may access instructions from memory 700, from other components of image-capturing device 501, and/or from a source external to image-capturing device 501 (e.g., a network or another device).

Control unit 730 may provide for different operational modes associated with image-capturing device 501. Additionally, control unit 730 may operate in multiple modes simultaneously. For example, control unit 730 may operate in a camera mode, a music player mode, and/or a telephone mode. For example, when in camera mode, face-detection and tracking logic may enable image-capturing device 501 to detect and track multiple objects (e.g., the presence and position of each object's face) within an image to be captured. The face-detection and tracking capability of image-capturing device 501 will be described in greater detail below.

Although FIG. 7 illustrates exemplary internal components, in other implementations, image-capturing device 501 may include fewer, additional, and/or different components than the exemplary internal components depicted in FIG. 7. For example, in one implementation, image-capturing device 501 may not include transceiver 720. In still other implementations, one or more internal components of image-capturing device 501 may include the capabilities of one or more other components of image-capturing device 501. For example, transceiver 720 and/or control unit 730 may include their own on-board memory.

Figure 8:
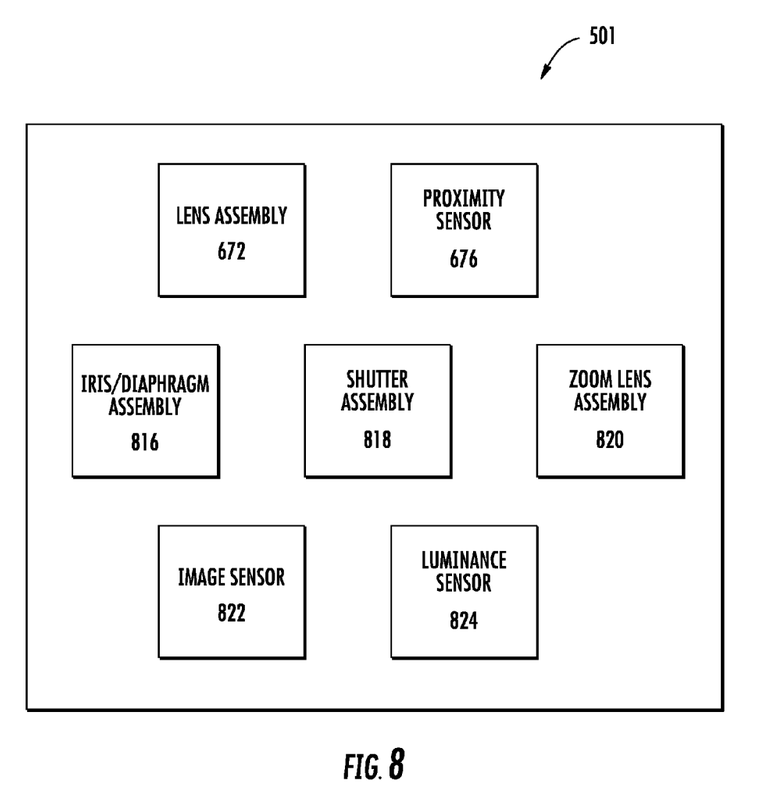
FIG. 8 is a diagram illustrating components of an exemplary camera depicted in FIG. 5, in accordance with embodiments of the present invention.

Referring now to FIG. 8, FIG. 8 is a diagram illustrating components of the exemplary camera depicted in FIG. 7. FIG. 8 illustrates lens assembly 672, proximity sensor 676, an iris/diaphragm assembly 816, a shutter assembly 818, a zoom lens assembly 820, an image sensor 822, and a luminance sensor 824.

Iris/diaphragm assembly 816 may include any component providing an aperture. Iris/diaphragm assembly 816 may be a thin, opaque, plastic structure with one or more apertures. This iris/diaphragm assembly 816 may reside in a light path of lens assembly 672. Iris/diaphragm assembly 816 may include different size apertures. In such instances, iris/diaphragm assembly 816 may be adjusted to provide a different size aperture. In other implementations, iris/diaphragm assembly 816 may provide only a single size aperture.

Shutter assembly 818 may include any component for regulating a period of time for light to pass through iris/diaphragm assembly 816. Shutter assembly 818 may include one or more shutters (e.g., a leaf or a blade). The leaf or blade may be made of, for example, a metal or a plastic. In one implementation, multiple leaves or blades may rotate about pins so as to overlap and form a circular pattern. In one implementation, shutter assembly 818 may reside within lens assembly 672 (e.g., a central shutter). In other implementations, shutter assembly 818 may reside in close proximity to image sensor 822 (e.g., a focal plane shutter). Shutter assembly 818 may include a timing mechanism to control a shutter speed. The shutter speed may be adjustable.

Zoom lens assembly 820 may include lens elements to provide magnification and focus of an image based on the relative position of the lens elements. Zoom lens assembly 820 may include fixed and/or movable lens elements. In one implementation, a movement of lens elements of zoom lens assembly 820 may be controlled by a servo mechanism that operates in cooperation with control unit 730.

Image sensor 822 may include any component to capture light. For example, image sensor 822 may be a charge-coupled device (CCD) sensor (e.g., a linear CCD image sensor, an interline CCD image sensor, a full-frame CCD image sensor, or a frame transfer CCD image sensor) or a Complementary Metal Oxide Semiconductor (CMOS) sensor. Image sensor 822 may include a grid of photo-sites corresponding to pixels to record light. A color filter array (CFA) (e.g., a Bayer color filter array) may be on image sensor 822. In other implementations, image sensor 822 may not include a color filter array. The size of image sensor 822 and the number and size of each pixel may vary depending on image-capturing device 501. Image sensor 822 and/or control unit 730 may perform various image processing, such as color aliasing and filtering, edge detection, noise reduction, analog to digital conversion, interpolation, compression, white point correction, etc.

Luminance sensor 824 may include any component to sense the intensity of light (i.e., luminance). Luminance sensor 824 may provide luminance information to control unit 730 so as to determine whether to activate flash 674. For example, luminance sensor 824 may include an optical sensor integrated circuit (IC).

Although FIG. 8 illustrates exemplary components, in other implementations, image-capturing device 501 may include fewer, additional, and/or different components than the exemplary components depicted in FIG. 8. For example, when image-capturing device 501 is a film camera, image sensor 822 may be film. Additionally, it is to be understood that variations may exist among different devices as to the arrangement, placement, number, adjustability, shape, material, etc., relating to the exemplary components described above. In still other implementations, one or more exemplary components of image-capturing device 501 may include the capabilities of one or more other components of image-capturing device 501. For example, lens assembly 672 may include zoom lens assembly 820.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more," even though the phrase "one or more" or "at least one" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, etc.), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A method for determining a mood and a strength of an image, the method comprising:
   determining a mood index for an image based at least on a color tone of the image, a color saturation of the image and an image pattern coefficient associated with an image pattern that is matched to a human face present in the image;
   determining a strength of an image based on a brightness of the image;
   determining a mood-strength distribution of the image based on the mood index of the image and the strength of the image; and
   selecting, using a computing device, a music piece based on the mood-strength distribution of the image.

2. The method of claim 1, further comprising:
   plotting the mood index of the image and the strength of the image on a dual-axis chart, wherein the chart comprises a mood index axis and a strength axis, and wherein the plotted image represents a mood-strength distribution of the image.

3. The method of claim 1, wherein a hue of the image represents the color tone of the image and a chroma of the image represents the color saturation of the image.

4. The method of claim 1, wherein the mood index is associated with a happiness scale.

5. The method of claim 4, wherein an image that has a predominantly cyan color tone is placed lower on the happiness scale compared to an image that has a predominantly red color tone.

6. The method of claim 4, wherein an image that has higher color saturation level is placed higher on the happiness scale compared to an image that has a lower color saturation level.

7. The method of claim 1, further comprising determining a grid for the image, wherein the grid divides the image into a grid of blocks, and wherein a size of the grid is based on a size of the image.

8. The method of claim 7, further comprising:
   determining a color tone and a color saturation for each block in the grid of blocks; and
   plotting a hue and chroma color space based on the determined color tone and the color saturation for each block in the grid of blocks.

9. The method of claim 7, further comprising:
   determining an intermediary mood index for each block in the grid of blocks; and
   determining the mood index based on a summation of the intermediary mood indices.

10. The method of claim 9, further comprising:
    determining whether the human face is present in the image;
    in response to determining the human face is present in the image, determining whether an image pattern associated with the face substantially matches the image pattern in a database of image patterns;
    determining the image pattern coefficient associated with the matched image pattern; and
    using the image pattern coefficient in determining the intermediary mood index.

11. The method of claim 1, wherein the strength of the image is associated with a strength scale, and wherein an image with a higher brightness level is placed higher on the strength scale compared to an image that a lower brightness level.

12. The method of claim 1, wherein the brightness of the image is determined based on histogram information associated with the image, wherein the histogram information is a graphical representation of an energy distribution of the image.

13. The method of claim 1, wherein the computing device comprises a portable mobile communication device.

14. The method of claim 1, wherein the selecting step comprises determining a music piece such that a mood-strength distribution of the music piece substantially matches the mood-strength distribution of the image.

15. The method of claim 1, further comprising:
    presenting the image as part of an image slideshow, wherein the slideshow comprises at least two images; and
    playing the music piece simultaneously with the presentation of the image slideshow.

16. An apparatus for determining a mood and a strength of an image, the apparatus comprising:
    a memory;
    a processor; and
    a module stored in the memory, executable by the processor, and configured to:
    determine a mood index for an image based at least on a color tone of the image, a color saturation of the image and an image pattern coefficient associated with an image pattern that is matched to a human face present in the image;
    determine a strength of an image based on a brightness of the image;
    determine a mood-strength distribution of the image based on the mood index of the image and the strength of the image; and
    select a music piece based on the mood-strength distribution of the image.

17. A computer program product for determining a mood and a strength of an image, the computer program product comprising:
    a non-transitory computer-readable medium comprising a set of codes for causing a computer to:
    determine a mood index for an image based at least on a color tone of the image, a color saturation of the image and an image pattern coefficient associated with an image pattern that is matched to a human face present in the image;
determine a strength of an image based on a brightness of the image;
determine a mood-strength distribution of the image based on the mood of the image and the strength of the image; and
select a music piece based on the mood-strength distribution of the image.

\* \* \* \* \*